Patented Feb. 8, 1927.

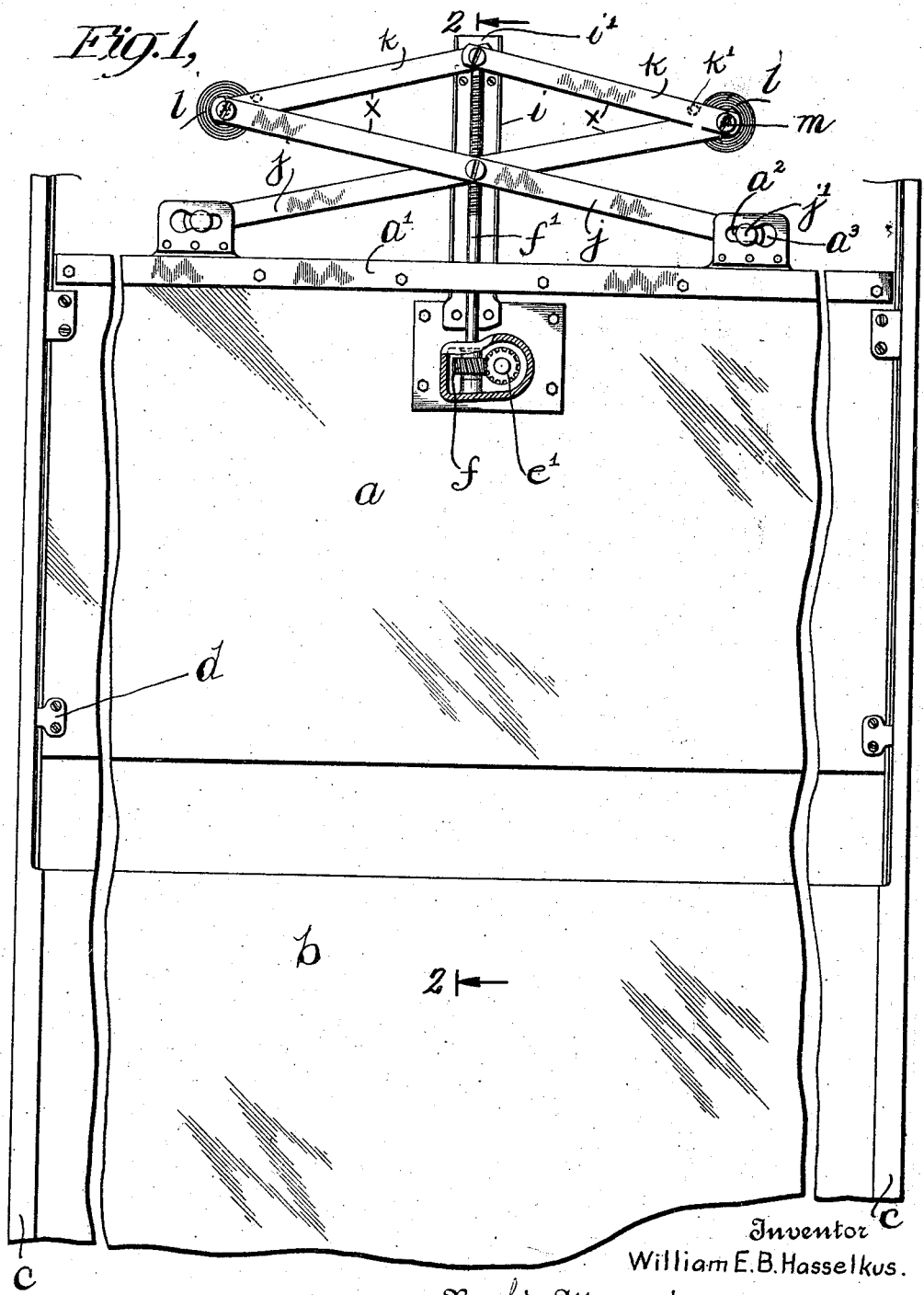

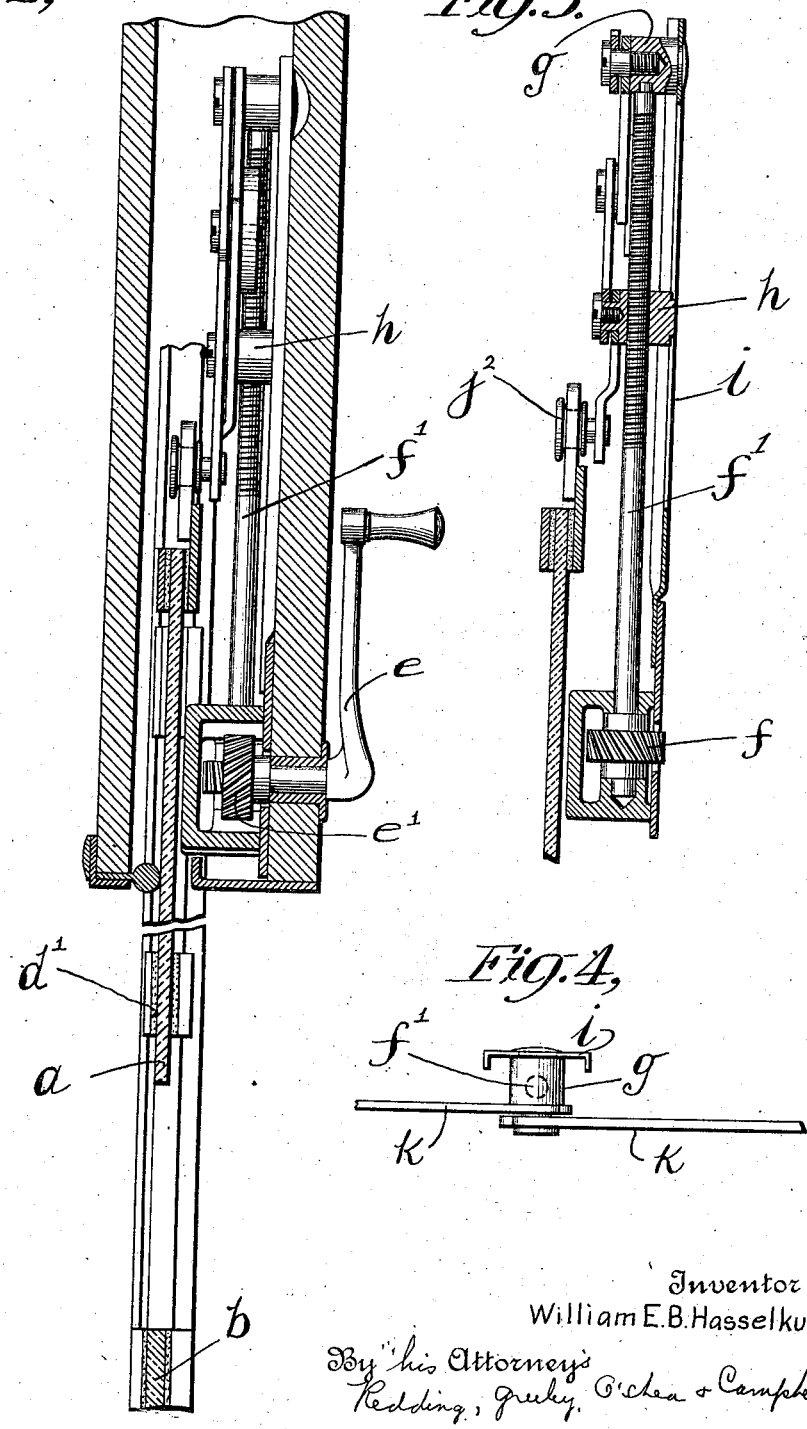

1,616,619

UNITED STATES PATENT OFFICE.

WILLIAM E. B. HASSELKUS, OF JAMAICA, NEW YORK, ASSIGNOR TO INTERNATIONAL MOTOR COMPANY, OF NEW YORK, N. Y., A CORPORATION OF DELAWARE.

WINDSHIELD.

Application filed July 3, 1926. Serial No. 120,259.

This invention relates to windshields for vehicles of the kind in which a transparent portion is movable to provide a ventilating aperture and has for its object a construction of windshield and actuating mechanism therefor which is practical from the standpoint of manufacture and ease of operation by an occupant engaged in driving the vehicle. According to the invention the windshield comprises a plurality of transparent sections disposed in the same plane, one of which is movable in that plane to afford a passage for air by means of actuating mechanism including a system of levers connected with the movable section and so associated with spring means that the springs resist the tendency of the window to close and act as a counterpoise therefor. The invention will now be described in greater particularity in connection with the accompanying drawings illustrating a preferred embodiment thereof, in which:

Figure 1 is a view in front elevation showing a windshield and the actuating mechanism for raising and lowering the same.

Figure 2 is a transverse vertical sectional view taken in the plane indicated by the line 2—2 in Figure 1, looking in the direction of the arrows and showing in detail the actuating mechanism for raising and lowering the movable pane.

Figure 3 is a fragmentary view showing the construction illustrated in Figure 2 in greater detail, parts being removed or sectioned in the interest of clearness.

Figure 4 is a fragmentary view looking from above and showing the pivotal connection for the system of leverage.

The movable pane of glass $a$ lies in the same plane as the remainder and stationary part of the windshield indicated at $b$ in Figure 1 and is slidable vertically in grooves in the upright frame members $c$. $c$. Preferably the movable pane is guided by metallic guides $d$ comprising bifurcated members clamping the glass therebetween and having yielding nonmetallic material $d'$ interposed between glass and metal to cushion the glass against vibration.

The pane $a$ is raised or lowered by rotating a handle $e$ within easy reach of the operator of the vehicle which turns through the co-operating spiral gears, $e'$ and $f$, a threaded rod $f'$ journaled at its upper end in a bearing member $g$ and reciprocating by its motion a nut $h$ which is guided in a groove formed by the inwardly turned edges $i$ of the supporting member $i'$. The metallic cross frame member $a'$ secured to the top of the movable pane $a$ is connected to the reciprocating nut $h$ by means of levers $j$, $j$, having a lost motion connection with the frame member $a'$. These levers extend upwardly in opposite directions beyond the nut $h$ to which they are pivoted and are connected to links $k$ swiveled on the bearing $g$. Thus as the nut $h$ travels upwardly along the threaded rod $f'$ the respective angles $x$ between the links $k$ and levers $j$ are reduced. Conversely when the pane $a$ is lowered, the angles $x$ are increased as the arms separate. They tend to place spiral springs $l$ connected at one end to the pivots $m$ and at their other end to pins $k'$ carried on the links, under tension and this tension serves to cushion or resist the downward movement of the pane to serve as a counterpoise therefor.

To facilitate the removal of the movable section independently of the actuating mechanism slots $a^2$ within which the pins $j'$ on the end of the levers $j$ reciprocate are formed at their outer ends with portions $a^3$ of enlarged diameter through which the enlarged heads $j^2$ on the pins $j'$ may pass.

It will thus be seen that a windshield has been provided whereof one section is movable to provide a ventilating aperture in a simple manner from actuating mechanism within convenient reach of an operator of the vehicle while the movable section itself is provided with a counterpoise counterbalancing the weight of the section which facilitates the raising thereof and tends to resist a sudden closure of the opening which might shatter the glass. Various modifications may be made in the configuration of the actuating mechanism as well as the type of counterpoise without departing from the spirit and scope of the invention as set forth in the appended claims.

What is claimed is:

1. In a windshield, in combination, a relatively stationary section, a relatively movable section, a vertical threaded rod, means to rotate the rod, a nut reciprocal along the rod, levers pivotally connected at their respective ends to the movable section and intermediate their ends to the movable nut and links rotatable about a point above the path of travel of the nut and pivotally connected at their opposite ends to the free ends of the levers, respectively.

2. In a windshield, in combination, a relatively stationary section, a relatively movable section, a vertical threaded rod, means to rotate the rod, a nut reciprocal along the rod, levers pivotally connected at their respective ends to the movable section and intermediate their ends to the movable nut and links rotatable about a point above the path of travel of the nut pivotally connected at their opposite ends to the free ends of the levers, respectively, and spiral springs connected at their inner end to the last named pivots and at their outer ends to the links.

3. In a windshield, in combination, a movable section, a vertical threaded rod, means to rotate the rod, a nut reciprocal along the rod, levers pivotally connected at their respective ends to the movable section and intermediate their ends to the movable nut and links rotatable about a point above the path of travel of the nut pivotally connected at their opposite ends to the free ends of the levers, respectively, and spiral springs connected at their inner end to the last named pivots and at their outer ends to the links.

4. In a windshield, in combination, a pair of spaced uprights formed with channels in their proximate faces, a pane of glass disposed between the uprights, metallic guides carried with the pane of glass and entering the channels, yielding non-metallic material disposed between the guides and the glass, a metallic frame member secured to one transverse edge of the pane of glass, a vertical threaded rod, means to rotate the rod, a nut reciprocal along the rod, levers pivotally connected at their respective ends to the said metallic frame member and intermediate their ends to the movable nut, and links rotatable about a point above the path of travel of the nut and pivotally connected at their opposite ends to the free ends of the levers, respectively.

5. In a windshield, in combination, a pair of spaced uprights formed with channels in their proximate faces, a pane of glass disposed between the uprights, metallic guides carried with the pane of glass and entering the channels, yielding non-metallic material disposed between the guides and the glass, a metallic frame member secured to one transverse edge of the pane of glass, a vertical threaded rod, means to rotate the rod, a nut reciprocal along the rod, levers pivotally connected at their respective ends to the said metallic frame member and intermediate their ends to the movable nut, links rotatable about a point above the path of travel of the nut and pivotally connected at their opposite ends to the free ends of the levers, respectively, and spiral springs connected at their inner end to the last named pivots and at their outer ends to the links.

This specification signed this 30 day of June A. D. 1926.

WILLIAM E. B. HASSELKUS.